E. HARRIS.
Steam-Plow.

No. 28,368. Patented May 22. 1860.

Witnesses:
Justin H. Olds
Rufus Casey

Inventor:
Elijah Harris

UNITED STATES PATENT OFFICE.

ELIJAH HARRIS, OF PRINCETON, ILLINOIS.

IMPROVEMENT IN SPADE-PLOWS.

Specification forming part of Letters Patent No. 28,368, dated May 22, 1860.

*To all whom it may concern:*

Be it known that I, ELIJAH HARRIS, of Princeton, in the county of Bureau and State of Illinois, have invented a new and useful Improvement in Spade-Plows; and I do hereby declare that the following is a full, clear, and exact description of the construction and operation of the same, reference being had to the annexed drawings, making a part of this specification, in which—

Figure 2:
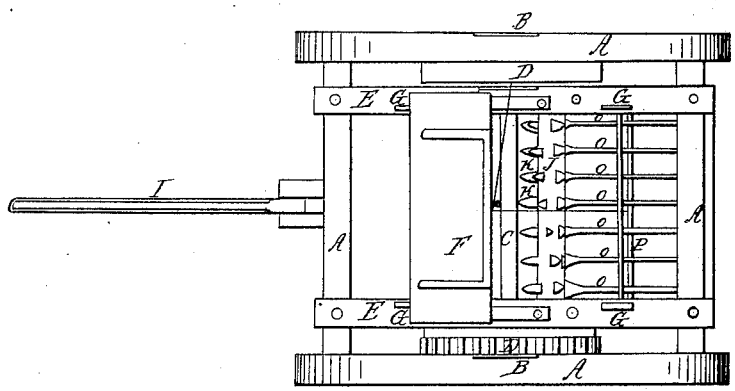
Figure 1:
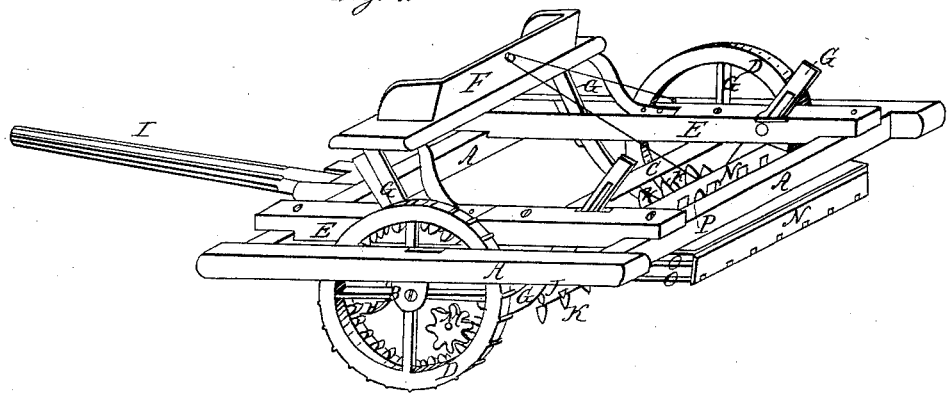
Figure 3:
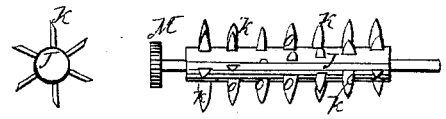

Figure 1 represents a side view; Fig. 2, plan or top view; Fig. 3, cylinder with spades.

Letter A represents the frame of carriage; b b, irons for the insertion of the ends of axles; C, the axle; D D, master or driving wheels with cogs on the inside; E E, cross-bars running lengthwise of the frame A inside of the wheels; F, seat; G G, arms; H, guide-wheel; I, nep; J, cylinder; K K, spades inserted in cylinder in rows that pass spirally around said cylinder; L L, pivots at the end of cylinder J, passing through arms G G; M M, pinions on the ends of pivots L L, geared to master-wheels D D, N, slotted guide for scrapers; O O, scrapers passing through slotted guide N to spades K K; P, rod to raise scrapers O O by means of a cord attached to seat F.

To enable others skilled in the art to make and use my invention, I will proceed to describe its construction and operation.

I construct a frame, represented A, of wood, nearly square, to which irons B B, for the insertion of the ends of the axle C. The axle is made of iron, to which the master or driving wheels D D are secured. These wheels are made with cogs on the inside, and work inside of the frame A. I make cross-bars E E of wood, passing lengthwise of the frame on the inside of the wheels D D, and secure them to said frame by means of bolts. Seat F for driver is supported on said cross-bars, which bars have slots for the reception of arms G G. These arms are made of iron or other suitable metal, having a joint. In the lower part of each arm is a hole pierced through, each one containing a slot in the upper end, through which a bolt passes to fasten it to the cross-bar E E. One end can be fastened with a wedge.

H is a guide-wheel supporting the front part of the frame A.

Letter I represents a common nep or pole; J, a cylinder supported by pivots passing through arms G G, and may be raised or lowered at discretion.

K K, spades made of suitable metal, and made sharp and brought nearly to a point, so as to pass into the ground easily, are inserted in said cylinder in rows that pass spirally around it pivots L L at the end of cylinder J.

Pinions M M are fastened onto the end of pivots L L, and gear into master-wheels D D, which causes the spades to move with sufficient velocity to turn up the soil to the depth that the spades enter it.

Guide N has two slots in the back part of it, and is fastened under the back part of frame A. The front part has slots to guide scrapers O O onto spades K K. These scrapers are made of rods of iron, having holes, and playing on pivots at the back end, where they are attached to the slotted guide N. The front part is flattened and bent down, which plays upon the spades to clean them. These scrapers are raised when it is necessary to back the plow by means of a rod, P, which passes under them, having a cord attached to it and the seat. The scrapers and rod are moved back and forth to correspond with the spades by means of the slots in guide N.

The nature of my invention consists in making a spade-plow supported and driven by master or driving wheels, causing the cylinder, furnished with spades in spiral rows, to revolve with sufficient velocity to thoroughly cut up and turn over the soil to any reasonable depth. The cylinder is hung on pivots passing through arms, by which means the spades can be raised and lowered as the ground requires, or thrown out of gear, and at the same time, by means of scrapers kept in their places by a slotted guide, keep said spades clean and unclogged.

I do not claim broadly the spades and cylinder, nor the wheels and pivots, as they have been formerly known and used.

What I claim as my invention, and desire to secure by Letters Patent, is—

The arrangement of cylinder J, in combination with spades K K, pivots L L, pinions M M, master or driving wheels D D, arms G G, slotted guide N, scrapers O O, and rod P, with a cord attached to it, substantially as shown and described.

ELIJAH HARRIS.

Witnesses:
 JUSTIN H. OLDS,
 RUFUS CAREY.